Nov. 10, 1931. J. DE LOPATTO 1,830,983
ANTISKID DEVICE
Filed Feb. 25, 1929
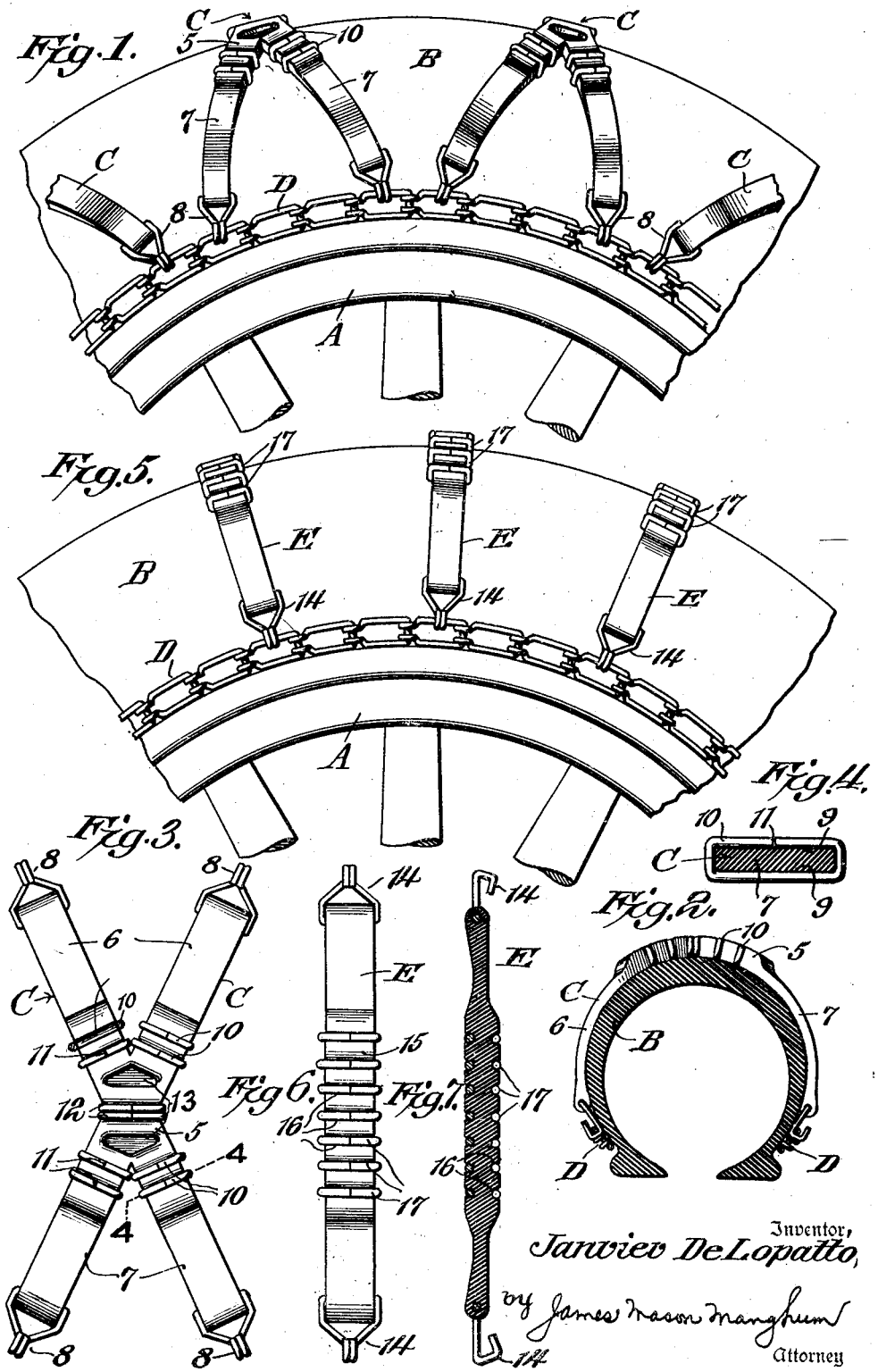

Patented Nov. 10, 1931

1,830,983

UNITED STATES PATENT OFFICE

JANVIER DE LOPATTO, OF WASHINGTON, DISTRICT OF COLUMBIA

ANTISKID DEVICE

Application filed February 25, 1929. Serial No. 342,452.

This invention relates to new and useful improvements in anti-skid devices generally, although the invention is especially adapted for use in connection with vehicle wheels.

The principal object of the invention is to provide a plurality of cleats which are adapted to be readily attached to a pair of endless chains arranged on opposite sides of a vehicle wheel, and to construct each cleat in the form of a rubber strap having a plurality of wear resisting metal rings extending therearound and held against movement relative to the strap.

Another object of the invention lies in the provision of a cleat formed from a rubber strap having a central portion which is thicker than the end portions and formed with a plurality of transverse grooves in its outer face for respectively receiving the metal rings.

A still further object of the invention lies in the provision of an anti-slipping cleat which is extremely simple in construction, is cheap to manufacture, and is capable of extended use without materially affecting its usefulness.

With these and other objects in view which will more fully appear, the nature of the invention will be more clearly understood by following the description, the appended claim, and the several views illustrated in the accompanying drawings.

Figure 1 is a fragmentary elevational view of a vehicle tire showing one embodiment of my invention, Figure 2 is a cross section taken on the line 2—2 of Figure 1, Figure 3 is a plan view of one of the cleats shown in Figure 1, Figure 4 is a cross section taken on the line 4—4 of Figure 3, Figure 5 is a view similar to Figure 1 but showing another form of my invention, Figure 6 is a plan view of one of the cleats shown in Figure 5, and Figure 7 is a longitudinal sectional view therethrough.

Like reference numerals designate corresponding parts throughout the several figures of the drawings.

In the accompanying drawings and with particular reference to Figures 1 to 3, I have shown a vehicle wheel A having the usual pneumatic tire B mounted thereon. Extending transversely of the tire is a plurality of anti-skid cleats C which are detachably connected at their ends to chains D which are of the endless type.

Each cleat C is formed with a rubber body and is shaped to provide two straps c, c which are crossed at their centers as at 5 to form resultant pairs of diverging terminal portions 6, 6 and 7, 7, said portions being relatively long and narrow. Connected to the outer end of each portion is a hook 8, and these hooks are adapted for engaging the chains D and thereby anchor the cleats against movement relative to the tire. In other words, each cleat C includes opposite pairs of relatively long and narrow terminal portions which converge inwardly and have their inner ends united with a common center. The center portion 5 and the inner portions of the terminal portions 6 are thicker than the outer portions of said terminal portions, and formed in the outer faces of said inner portions is a plurality of transverse grooves 9 for respectively receiving elongated metal wear-resisting rings 10 having their open ends 11 disposed in said grooves. The groove in the central portion 5 receives one or more rings 12. The rings 10 and 12 are preferably arranged flush with the outer or tread surface of the thickened portions. By locating the open ends 11 of the rings in the grooves, all danger of said ends engaging and damaging the tire is eliminated. The central portion 5 is provided on its outer face with depressions 13 which function as suction cups to assist in preventing skidding, and also serve to reduce the amount of rubber in the cleat and to correspondingly reduce the cost of manufacture thereof.

The form illustrated in Figures 4 to 7, is quite similar to the form just described. In this second form, I provide a plurality of cleats E which are connected to similar chains D. Each cleat E is formed by a single strap of rubber having attaching hooks 14, 14 at its ends and provided at its center with an elongated thickened portion 15 having a plurality of transverse grooves 16 formed therein for respectively receiving the rings 17. The grooves and rings are arranged in the same relation as the grooves 9 and rings 10 of the previously described form.

From the foregoing it will be observed that I have provided an anti-skid strap which is extremely simple in construction and is therefore cheap to manufacture and embodies a construction which may be readily applied to a vehicle wheel.

It is of course to be understood that the details of structure and arrangements of parts may be variously changed and modified without departing from the spirit and scope of my invention.

I claim:

In an anti-skid device a cross-shaped cleat member having the four ends thereof extended one pair at each side for connection with suitable mounting devices the crossed portion being considerably thicker than said extended ends and said thickened portion extending a short distance along each extended end said cleat having formed in its road surface a cup-like depression at each side of the center of the thickened crossed portion, a centrally disposed metal reinforcing loop, and a metal reinforcing loop carried by each thickened extension whereby each depression is positioned between the central metal loop and a pair of the extension carried metal loops.

In testimony whereof I hereunto affix my signature.

JANVIER DE LOPATTO.